US005694514A

United States Patent [19]
Evans et al.

[11] Patent Number: 5,694,514
[45] Date of Patent: Dec. 2, 1997

[54] SYSTEM AND METHOD FOR CREATING PERSONALIZED IMAGE COLLECTIONS FROM MULTIPLE LOCATIONS BY USING A COMMUNICATION NETWORK

[75] Inventors: James Gifford Evans, Colts Neck; Richard H. Janow, South Orange; Howard M. Singer, Marlboro; Lee B. Strahs, Oceanport, all of N.J.

[73] Assignee: Lucent Technologies Inc., Murray Hill, N.J.

[21] Appl. No.: 606,255

[22] Filed: Feb. 23, 1996

Related U.S. Application Data

[63] Continuation of Ser. No. 111,327, Aug. 24, 1993, abandoned.

[51] Int. Cl.$^6$ ............................................. H04N 5/76
[52] U.S. Cl. ................................... 386/46; 358/906
[58] Field of Search ........................ 358/335, 342, 358/906; 360/35.1, 33.1, 5; 348/157, 159, 152, 153; 386/46, 107, 117, 95, 60, 125; H04N 5/76, 5/77

[56] References Cited

U.S. PATENT DOCUMENTS

| | | | |
|---|---|---|---|
| 4,567,532 | 1/1986 | Baer et al. | 358/342 |
| 4,688,105 | 8/1987 | Bloch et al. | 358/335 |
| 4,888,648 | 12/1989 | Takeuchi et al. | 358/335 |
| 4,943,854 | 7/1990 | Shiota et al. | 358/342 |
| 5,111,410 | 5/1992 | Nakayama et al. | 348/157 |
| 5,283,644 | 2/1994 | Maeno | 348/152 |
| 5,283,819 | 2/1994 | Glick et al. | 348/552 |

OTHER PUBLICATIONS

"Microwave/Radio Frequency Tags", D. Sarnoff Research Center, pp. 1–3.
Nippondenso, Fuji, Tokyo, Japan, pp. 1–5.
"Breeders track ostriches", p. 1.
"2,400 shirts/hour!", Designer's Corner, Design News/Feb. 1, 1993/47.

*Primary Examiner*—Thai Tran
*Assistant Examiner*—Huy Nguyen
*Attorney, Agent, or Firm*—Thomas Stafford; Eugene J. Rosenthal

[57] ABSTRACT

A system for creating still image or video collections for guests of amusement parks and the like a) identifies individuals by a unique tag assigned to the individual, b) automatically records the images of the individuals while they are at various attractions, c) collects the images over a communications network, d) arranges the images in a collection, and e) presents a personal set of collected images to the guest. For example, cameras may be located throughout an amusement park. Each guest is associated with a unique identifier. This identifier may be contained within a readable tag, e.g., a card, badge or pendant. Tag readers identify guest when they are at a particular location and provide identification and location information to a control system. A communications network is used to interconnect the cameras, tag readers, control system and image recording devices. The control system controls the recording and storage of the appropriate image(s) associated with that guest. The images of the guest may be associated with prerecorded images of the amusement park. Advantageously, a reporting system captures information on guest traffic patterns throughout their visit.

32 Claims, 4 Drawing Sheets

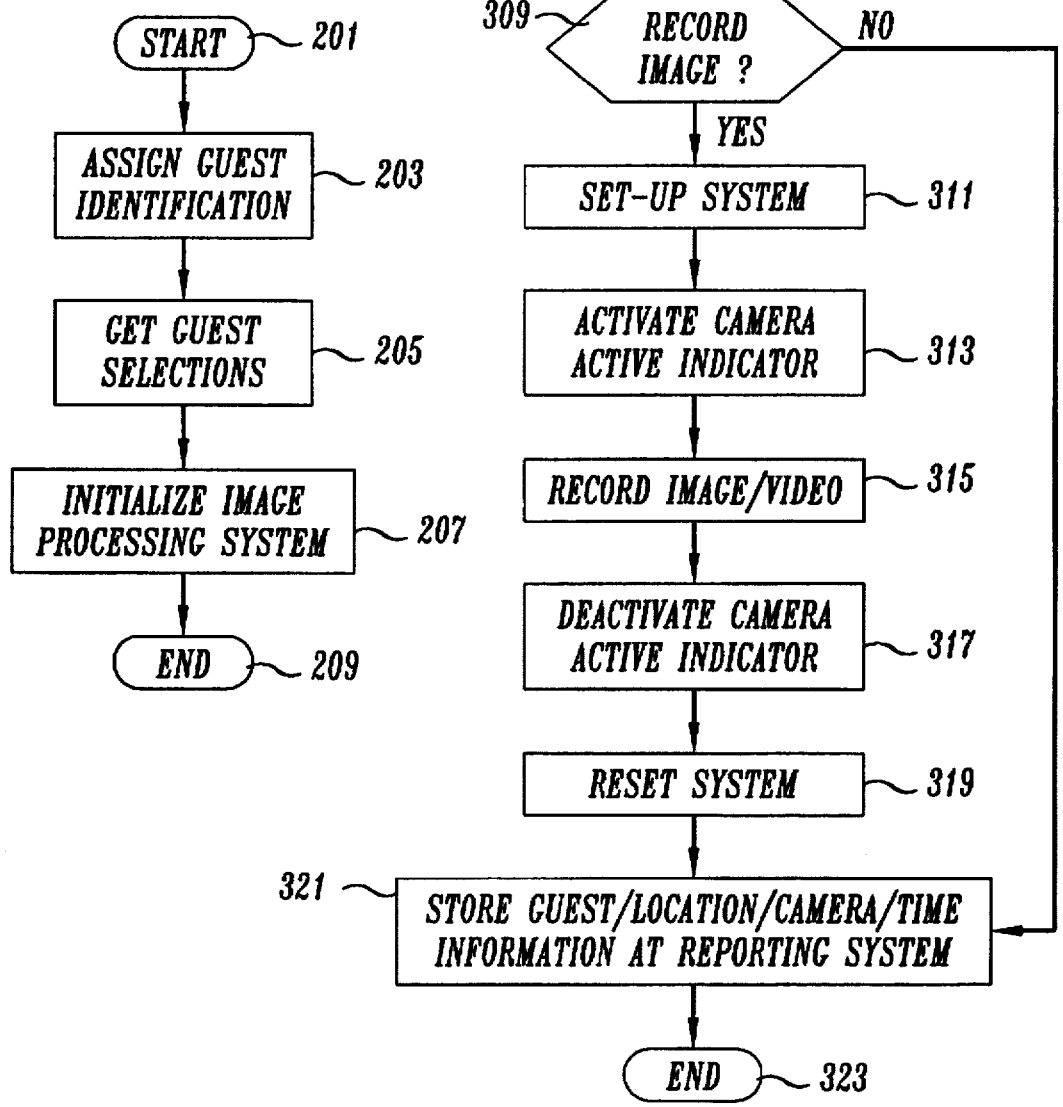

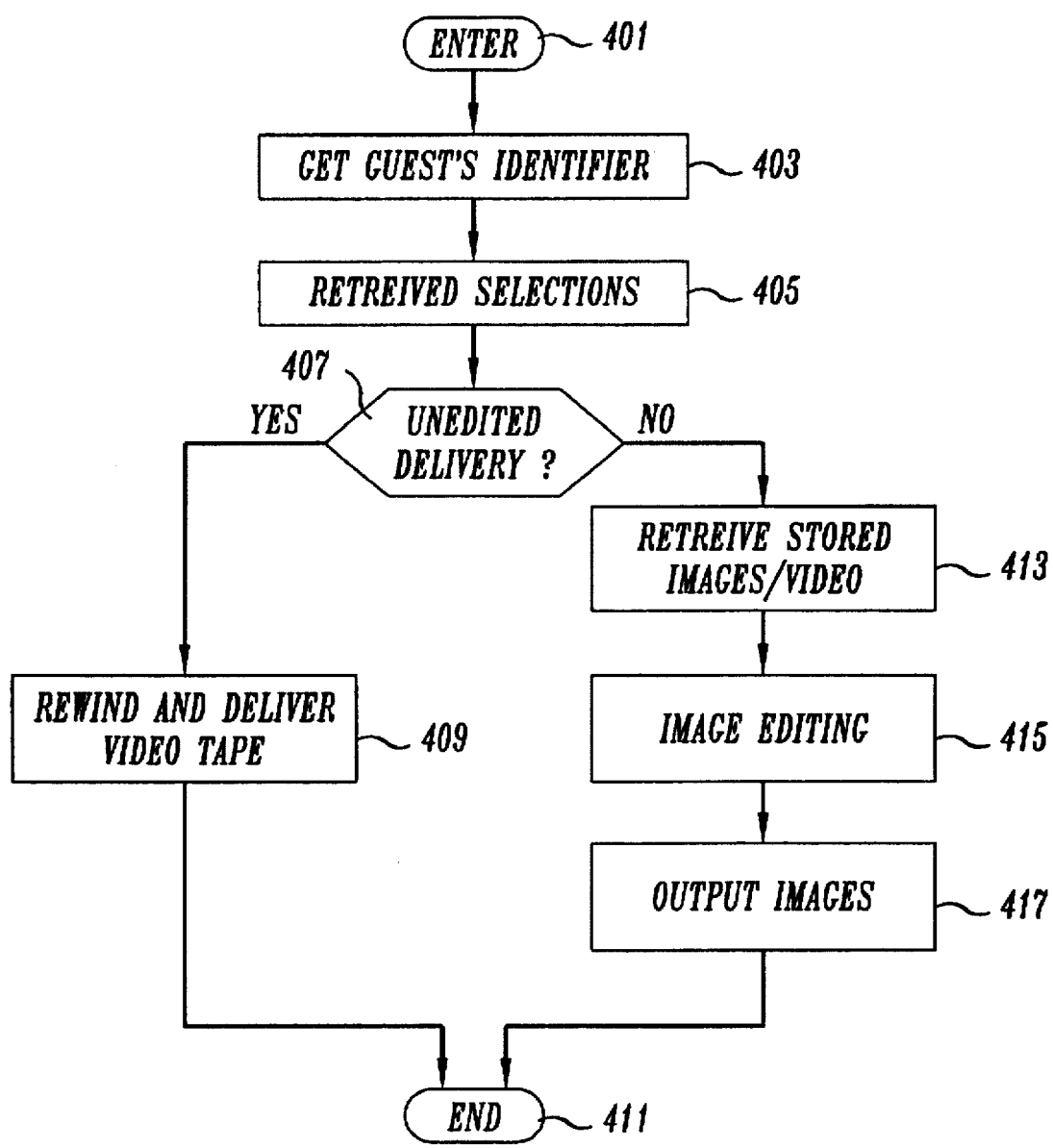

FIG. 5  501

| GUEST'S IDENTIFIER 503 | GUEST'S NAME 505 | GUEST'S ADDRESS 507 | VIDEO/STILL 509 | EDITING 511 | NUMBER OF ATTRACTIONS 513 | TAPE NO. 515 | MEDIA/FORMAT 517 | DELIVERED 519 |
|---|---|---|---|---|---|---|---|---|
| 12345 | MIKE EVANS | 1313 MOCKINGBIRD | VIDEO | NO | 5 | 1 | VHS | YES |
| 12346 | RICH JANOW | 1313 SPACELY TWR | STILL | YES | ALL | X | PHOTO CD | NO |
| 12347 | EUGENE ROSENTHAL | 1414 BEDROCK LA | VIDEO | YES | ALL | 2 | VHS | YES |
| 12348 | HOWIE SINGER | 1111 MAIN STREET | VIDEO | NO | 15 | 3 | BETA | NO |
| ... | ... | ... | ... | ... | ... | ... | ... | ... |
| 12349 | LEE STRAHS | 1616 TOON RD | STILL | YES | 10 | X | PRINTS | NO |

SYSTEM AND METHOD FOR CREATING PERSONALIZED IMAGE COLLECTIONS FROM MULTIPLE LOCATIONS BY USING A COMMUNICATION NETWORK

This is a Continuation of application Ser. No. 08/111,327 filed Aug. 24, 1993, now abandoned.

TECHNICAL FIELD

This invention relates to image capture and particularly to the capturing and creation of customized videos or photo albums.

BACKGROUND OF THE INVENTION

Guests of amusement parks, golf courses, ski resorts and the like, often desire to capture a still image or video record of their visit. (The term "video" is used herein according to its conventional meaning and, therefore, includes any corresponding associated audio information.) To do so, they often must lug around with them still or video cameras and have somebody available who can take their picture. This tends to be inconvenient, especially for the person who has to do the picture-taking. In some cases there is no person available to do the picture-taking. As a result there are undesired gaps in the recorded images. Furthermore, it is not always possible to obtain the desired picture, because the camera cannot be situated in such a way as to capture the desired field of view. There also may be problems with lighting and motion.

One prior art solution is for the amusement park to provide a person whose responsibility it is to take particular predefined pictures which are then sold to the guest. Typically, this is limited to still pictures only. Another prior art solution is to have a camera trained at a fixed location for automatically capturing images in response to a mechanical switch or a radio signal. Such systems, however, are limited to capturing the object in which the triggering device is located. For example, in an amusement park setting, the triggering device would be located in each car of a ride. Each car is automatically photographed and the guest, upon conclusion of the ride, can decide if he wishes to purchase the individual picture. These prior art techniques are insufficient to provide a satisfying still image or video recollection for the guest.

SUMMARY OF THE INVENTION

The problems with prior art still image or video collection for amusement parks and the like are overcome, in accordance with the principles of the invention, by a) tagging individuals for identification, b) automatically recording the images of the tagged individuals while they are at various attractions, c) collecting the images over a communications network, and d) arranging the images in a collection. A personal set of collected images can then be presented to the guest.

In one embodiment of the invention, cameras are located throughout an amusement park. Each guest is associated with a unique identifier. This identifier may be contained within a tag, e.g., a card, badge or pendant that is "readable" from a distance. Tag readers identify guests when they are at a particular location and provide identification and location information to a control system. A communications network is used to interconnect the cameras, tag readers, control system and image recording devices. The control system controls the recording and storage of the appropriate image (s) associated with that guest. In accordance with an aspect of the invention, the images of the guest may be combined with prerecorded images of the amusement park. Advantageously, a reporting system may capture information on guest traffic patterns throughout their visit, thereby providing information on attraction usage to the operator of the amusement park.

BRIEF DESCRIPTION OF THE DRAWING

FIG. 2 shows an exemplary guest registration process performed at the amusement park;

FIG. 3 shows an exemplary process for recording still images or video in accordance with the principles of the invention;

FIG. 4 shows an exemplary process for final preparation and delivery of the completed image collection; and FIG. 5 shows an exemplary data structure for storing information in the control system of FIG. 1.

DETAILED DESCRIPTION

Figure 1:
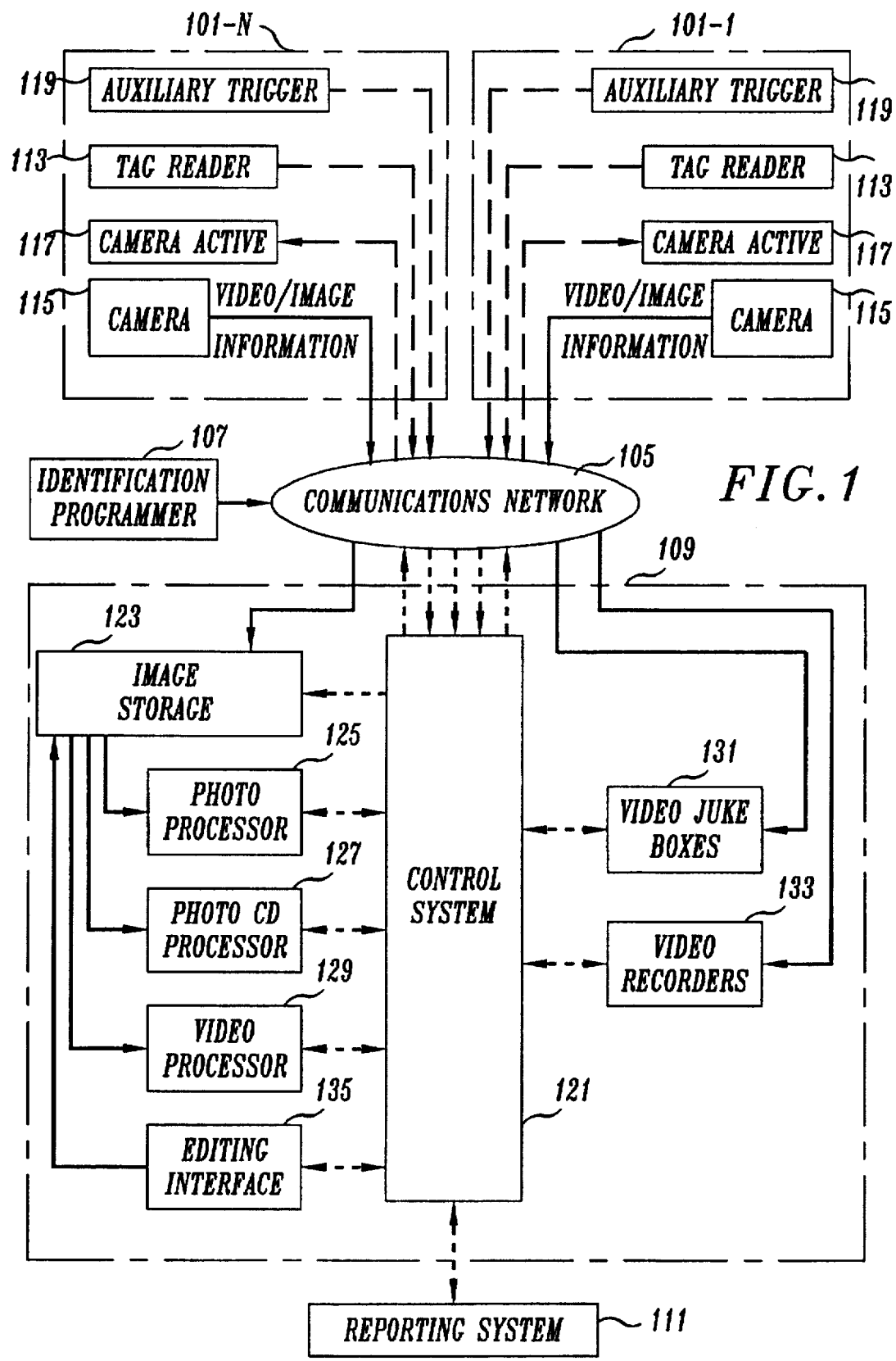
FIG. 1 shows an exemplary embodiment of the invention including attraction sites, a communications network, an identification programmer, an image processing system, and a reporting system.

The invention will be described herein in the context of an amusement park having rides and activities collectively known as attraction sites. An identification tag (not shown) is issued to each guest of the amusement park who wishes to have a personalized still image or video record of his visit automatically generated. The identification tags are used to activate cameras that have been strategically located at attraction sites throughout the park. Each camera is activated at the appropriate time and location for each guest. FIG. 1 shows an exemplary embodiment of the invention including a) attraction sites 101-1 through 101-N, collectively referred to herein as attraction sites 101, b) communications network 105, c) identification programer 107, d) image processing system 109, and e) reporting system 111.

Identification programmer 107 associates a tag with a particular guest and stores selections associated with the guest. The selections include whether still image or video will be taken and at which, or how many, attraction sites the system will be enabled for recording images of that guest. The information is transmitted over communications network 105 to processing system 109, where it is stored. FIG. 5 shows an exemplary data structure for storing information in control system 121.

Advantageously, identification programmer 107 can be located remotely from the amusement park, e.g., at a travel agent, to minimize preparation time at the park. Furthermore, the tag can be provided before arrival at the park and used as a ticket of admission. Identification programmer 107 can be 1) any conventional data entry device, e.g. a computer terminal, or 2) a combination data entry device and tag reader.

Each attraction site 101 includes at least tag reader 113 and camera 115. Each camera 115 is either a video or still image camera capable of remotely transmitting the images it captures. The various cameras 115 can have different characteristics. In particular, each camera 115 can be tailored to the requirements of the attraction site at which it is located, e.g., low light conditions, fast motion, auto-focus requirements or under water location.

Tag reader 113 reads the tags of guests when the guest approaches within its sensing range. Tag reader 113 transmits the identifier of the guest to image processing system 109 over communications network 105. In addition, tag reader 113 identifies itself to image processing system 109. This self-identification may be achieved by transmitting information that particularly identifies tag reader 113 or it may be implied from the connection of tag reader 113 to communications network 105.

In one embodiment of the invention, the tags are passive radio devices and the tag readers 113 are radio transmitters and receivers. Such a tag reader transmits a signal which is uniquely modulated by the passive radio device in the tag, in accordance with the prestored identification code, and is detected by the receiver in tag reader 113. Advantageously, in this embodiment of the invention, the guest is not required to take any action to activate tag reader 113 once he is within its range. It is noted that the principles for designing such passive radio systems are well known in the art. In addition, several systems for identifying things and/or people that employ passive radio systems are commercially available.

Optionally, each attraction site 101 can include camera active indicator 117 and auxiliary trigger 119. Camera active indicator 117 provides an indication to the guest that his image is being recorded. It is activated in response to a control signal from image processing system 109 via communications network 105. One example of a camera active indicator is a red light that is illuminated when an image is being recorded.

In certain applications, auxiliary trigger 119 provides a control signal to control recording of the signal supplied from camera 115, to insure that the guest's image is precisely captured. An auxiliary trigger is necessary when, for example, still images are taken of guests on fast moving attractions or to give guests control over the timing of the recording.

Communications network 105 can be any conventional communications network capable of transporting and switching video, still images, audio and data. Communications network 105 operates under the control of control system 121 in image processing system 109.

Image processing system 109 includes a) control system 121, b) image storage 123, c) photo processor 125, d) photo CD processor 127, e) video processor 129, f) video jukeboxes 131, g) video recorders 133, and h) editing interface 135.

In one embodiment, image storage 123 stores still images or video captured by cameras 115. The still images or video are supplied via communications network 105. Images are labeled with the 1) identifier of the guest, 2) the location of the camera, and 3) the time of day, which are supplied by the control system 121. Photo processor 125, photo CD processor 127 or video processor 129 process the stored images into the format desired by the guest, e.g., photographs, photo CD, or videotape. Optionally, editing interface 135 can be used to modify the stored images, e.g., cropping of the images and the addition of special effects, as well as to control the image selection and sequencing.

In another embodiment of the invention, only a video recording is produced. The patron's images are a) captured on cameras 115, b) transmitted by the communications network 105 under the control of the control system 121, and c) recorded in real time on either one of video jukeboxes 131 or one of video recorders 133. A video jukebox is a device, analogous to a convention record player jukebox, for automatically 1) loading, 2) playing or recording, and 3) replacing in its storage location each of the several video tapes stored in the jukebox. In the case of the video recorder 133, each guest desiring a video is assigned exclusively to a particular recorder for their visit. In the case of the video jukeboxes 131, guest's video tapes are loaded into the recorder automatically when they arrive at an attraction site 101, as indicated by tag reader 113 at that attraction site.

Advantageously, in accordance with an aspect of the invention, the video tapes employed in either of the foregoing embodiments are prerecorded with stock footage of the amusement park in general, and attraction sites 101 in particular. Upon a guest's arrival at one of attraction sites 101, the guest's video tape is cued up to the portion of the tape with the prerecorded material of that attraction site and the guest's video image from the appropriate one of cameras 115 is added at that point on the tape. Thus, the guest's video is combined with the remaining stock footage to create an exciting, personalized videotape. In accordance with an aspect of the invention, to minimize cuing delays, after each recording the tape is returned to its midpoint.

Reporting system 111 is a data collection and processing system. Control system 121 supplies to reporting system 111 information indicating each time that a guest came within range of one of tag readers 113 and the identifier of the guest. In particular, information concerning whether an image of the guest was recorded and any system status information. Advantageously, this information can be used by the operators of the amusement park to analyze the traffic patterns of guests to the various attraction sites.

Reporting system 111 may be a computer system, disk drive or any processing, storage or output device. Control system 121 can be a conventional computer system with multiple input/output ports. Those of ordinary skill in the art given the foregoing description will be able to design and program control system 121.

One embodiment of the invention the apparatus shown in FIG. 1 may be used in accordance with the processes shown in FIGS. 2, 3 and 4. In particular, FIG. 2 shows an exemplary guest registration process when guest registration is performed at the amusement park.

The process is entered in step 201, when the guest approaches identification programmer 107. In step 203, the guest is given an identification tag having a unique identifier. The guest's name and other identifying personal information is entered into identification programmer 107 as is the tag's identifier. This information is transmitted over communications network 105 to control system 121. The personal information and the unique identifier are associated together by control system 121, so that the guest can be identified from his identification tag.

Next, in step 205, the guest's selections are entered into identification programmer 107 and these are also stored in association with the unique identifier in control system 121. Again, the selections include whether still image or video will be taken and at which attraction site the system will be enabled for recording images of the guest. Again, FIG. 5 shows an exemplary data structure for storing information in control system 121.

Image processing system 109 is initialized in accordance with the selections of the guest, in step 207. Thus, for example, if the guest selected video, in an embodiment of the invention using video jukeboxes 131 or video recorders 133, the video tape is loaded for the guest in either video jukebox 131 or in one of video recorders 133. Furthermore, the particular video tape is associated with the guest by control system 121. If still images were selected by the guest, enough space to store the guest's still images is allocated in image storage 123. The process is exited in step 209 and the guest can continue his visit.

FIG. 3 shows an exemplary process for recording still images or video in accordance with the principles of the invention. The process is entered in step 301, when the guest approaches within the sensing range of one of tag readers 113. In step 303, tag reader 113 reads the identifier of the approaching guest from his tag. Next, in step 305, tag reader 113 transmits the identifier of the guest to image processing system 109 as well as an indication of its location. Thereafter, in step 307, control system 121 retrieves the guest's selections which were previously stored in the process shown in FIG. 2.

Conditional branch point 309 tests to determine if, according to the guest's selection, the guest's image should be recorded. If the test result is YES, control passes to step 311 in which the system is set up for recording. This includes, for video tapes being prepared in video jukeboxes 131 or video recorder 133, the cuing of the video tape to location corresponding to the attraction site 101 whose tag reader 113 was activated by the guest's tag. Step 311 also includes providing an image path from camera 115 through communications network 105 to the video tape of the guest or to image storage 123. Additionally, if an auxiliary trigger is required, the system waits until the auxiliary trigger associated with the particular cameras 115 is activated.

Control then passes to step 313, in which control system 121 transmits a signal causing the optional camera active indicator 117 associated with the camera 115 that is to capture the guest's image to activate. In step 315, the guest's image is recorded in either video jukebox 131, one of video recorders 133 or image storage 123. Upon conclusion of the recording, e.g., by expiration of a predetermined time, deactivation of auxiliary trigger 119, or by the guest moving out of the range of tag reader 113, control passes to step 317, in which the optional camera active indicator 117 is deactivated. Next, the system is reset for this guest in step 319. Resetting the system includes relinquishing the image path established in step 311 and, in the case of video tape recorders 133 or the video juicebox 131, returning the video tape to its midpoint.

If the step result in step 309 is NO, or at the conclusion of step 319, control passes to step 321, in which the guest, location, camera, and time information is supplied from control system 121 for storage in reporting system 111. The process then exits in step 323.

FIG. 4 shows an exemplary process for final preparation and delivery of the completed image collection. The process is entered in step 401, when the guest decides to obtain his completed image collection. The guest's identifier is obtained in step 403, e.g., by having the guest's tag read by a tag reader. Next, in step 405, the guest's selections are retrieved so that the appropriate final preparation can be completed.

Conditional branch point 407 tests to determine if the guest selected unedited delivery of a video tape. If the test result in step 407 is YES, control passes to step 409 in which the guest's video tape is rewound and retrieved from video jukeboxes 131 or video recorders 133. The video tape is then given to the guest. Control system 121 also stores an indication that the guest's tape has been delivered. The process then exits in step 411.

If the test result in step 407 is NO, control passes to step 413, in which the stored still images or video for the guest are retrieved from storage 123. In step 415, the guest indicates the particular editing he wishes for each image as well as the arrangement of the images that he desires. The guest performs the editing of this step using editing interface 135. Once editing is complete, control passes to step 417, in which the images are output according to the media and format selected by the guest in step 205 of the process shown in FIG. 2. The process then exits in step 411.

FIG. 5 shows table 501, an exemplary data structure for storing information in control system 121. Each row of table 501 corresponds to a particular guest and each column indicates a field in which that particular guest's information and/or options are stored. Guest's identifier field 503 stores the unique identifier assigned to each guest while guest's name field 505 and guest's address field 507 store, respectively, the guest's name and address. Video/still field 509 stores either the indication VIDEO if the guest has selected a video image collection or the indication STILL if the guest has selected a still image collection. If the guest desires editing of his images, editing field 511 will have the value YES. Otherwise, editing field 511 will have the value NO.

In this embodiment, the guest may select the number of attractions at which his image will be recorded, in increments of 5. Number of attractions field 513 stores the particular number of attractions selected by the guest or ALL, which indicates that the guest's image should be recorded at every attraction site the guest visits. Tape No. field 515 is for use in an embodiment where each guest who is to receive a video image collection is assigned an individual video tape. It indicates the particular video tape assigned to the guest. An "X" in Tape No. field 515 indicates that the guest is not receiving a video image collection. Media/Format field 517 indicates the particular medium, and format if applicable, of the image collection that is to be delivered to the guest.

Delivered field 519 indicates whether or not a guest's image collection has been delivered, e.g., handed over, to the guest. Initially, delivered field 519 is set to NO. When a guest's image collection is delivered the value of delivered field 519 is changed to YES.

The foregoing is merely illustrative. Those skilled in the art will be able to devise other embodiments of the invention. For example, in another embodiment of the invention the unique identifier of each guest need not be contained within a readable tag. Instead, the identifier may be a unique number that is told to the guest and each "tag reader" is a keyboard at which the guest may enter his identifier. In an alternative embodiment of the invention, the readable tags may be magnetically, optically, electrically or mechanically readable objects, e.g., cards. Furthermore, the tags may be made so that a guest may deactivate his tag to prevent his image from being recorded at particular attractions. This is useful so that a guest, especially one who only signed up to have his image recorded at a limited number of attraction sites, can better control at which, and in what order, his image is recorded.

As noted, communications network 105 can be any conventional communications network. In particular, communications network 105 can include elements of packet switching, circuit switching or both. The switching architecture of communications network 105 can be either centralized or distributed.

In one embodiment of the invention, identification programmer 107 can initially store and/or alter the identifier stored in a guest's tag. Also, multiple identification programmers may be interfaced to communications network 105. Some of the identification programmers may be located remotely and are connected by a telecommunications system, e.g., the public switch telephone network, to communications network 105.

In another embodiment of the invention, where video tapes are produced by using image storage 123 and video processor 129, the video tapes are recorded on as a guest progressively visits each attraction site. Instead of prerecording stock footage of the attraction sites on a guest's tape in a predetermined order, the appropriate stock footage is added along with the personal images for each guest. Advantageously, the ordering of the images of each attraction site may be arranged to correspond to the order in which the guest visited those attraction sites. Thus, a variety of real time and batch image processing can be used to generate the completed image collection.

In other embodiments of the invention, video jukeboxes 131 and video recorders 133 may be replaced by units that handle video disks instead of video tapes. Also, images could be retained locally at each camera site and downloaded upon demand to a central site when a guest goes to pick up his video. Furthermore, communications network 105 may be all or partly wireless, so that, for example, images could be communicated to image processing system 109 in wireless fashion. In addition, multiple tags may be associated together to allow a single image collection or video collection to be made for an entire family.

We claim:

1. An apparatus for use in image collection at a plurality of geographically diverse locations comprising:
    a plurality of image capture means, each being located at one of the plurality of geographically diverse locations;
    image recording means;
    a plurality of detecting means, each of said detecting means (i) having a detection range, (ii) being located substantially at one of the plurality of geographically diverse locations and being associated with at least one of said image capture means located at the same location and (iii) being responsive to the presence, within said detection range, of any guest, of a plurality of guests that are each individually identifiable, to generate an indication that indicates which at least one of said guests is presently to be found within said detection range at the one of the plurality of geographically diverse locations;
    a communications network through which said plurality of image capture means and said plurality of detecting means communicate to control means, the control means being responsive to each indication generated by any of said plurality of detecting means for operating said communications network and said plurality of image capture means in such a way that (i) images from each of said at least one image capture means associated with each of said plurality of detecting means generating an indication are recorded, and (ii) said recorded images are segregable by the identity of each of said identifiable guests.

2. The apparatus as defined in claim 1, wherein said control means causes said image recording means to mark each of said recorded images with the identity of the guests whose images are recorded in such a way that said images are segregable by the identity of each of said guests according to the mark on each of said recorded images.

3. The apparatus as defined in claim 1, wherein said control means causes each image for each of said guests to be recorded on a separate physical medium in such a way that said recorded images are segregable by the identity of each of said guests based on the medium on which they are recorded.

4. The apparatus as defined in claim 1, wherein said control means operates said image recording means to combine at least one recorded image of at least one of said guests with at least one prerecorded image of the environs in which said image capture means recording said at least one of said guests is located.

5. The apparatus as defined in claim 1, further including means for combining at least one recorded image of at least one of said guests with at least one prerecorded image of the environs in which said image capture means recording said at least one of said guests is located.

6. The apparatus as defined in claim 1, further including means for capturing information on traffic patterns of said guests as they move between the locations of said detecting means, said information being developed from said indications generated by said detecting means.

7. The apparatus as defined in claim 1, further including means for editing at least one image recorded by said recording means.

8. The apparatus as defined in claim 1, wherein said image recording means includes a plurality of image recording units, one unit being designated for each of said guests.

9. The apparatus as defined in claim 1, wherein said image recording means includes a plurality of recording media, each being of the same format, one unit being designated for each of said guests, said image recording means being shared among said recording media.

10. The apparatus as defined in claim 1, wherein said image recording means is a single integrated unit storing all the images of said guests.

11. The apparatus as defined in claim 1, wherein said communications network includes a cross-connect system.

12. The apparatus as defined in claim 1, wherein the one of said detecting means generating a particular indication is identified by the arrangement of the connection of said detecting means to said communications network.

13. The apparatus as defined in claim 1, wherein the one of said detecting means generating a particular indication is identified by said detecting means transmitting a predefined message.

14. The apparatus as defined in claim 1, wherein said at least one recorded image is a video image.

15. The apparatus as defined in claim 1, wherein said recorded images are still images.

16. The apparatus as defined in claim 1, further including means for indicating that the image being captured by a particular image capture means is being recorded.

17. The apparatus as defined in claim 1, including an auxiliary trigger means associated with one of said image capture means for controlling the start of recording from said associated image capture means.

18. The apparatus as defined in claim 1, wherein said image capture means is a camera.

19. A method of capturing images of guests in an amusement park at prestored, preselected locations out of a plurality of geographically diverse locations, comprising the steps of:
    reading a guest's identification;
    transmitting said guest's identification and an indication of a particular location of said guest out of the plurality of geographically diverse locations to a control system;
    retrieving from within said control system the prestored preselected locations of said guest;
    connecting an image capture means at the particular location to image storage means over a communications network; and
    activating said image storage means to record images from said image capture means in response to a selection by said guest indicating that his image should be recorded at the particular location.

20. The method as defined in 19, further including the step of activating, for the duration of image recording, an indicator to show that image recordation is in profess from the particular location.

21. The method as defined in 19, further including the step of waiting for an auxiliary trigger prior to activating said image storage means.

22. The method as defined in 19, further including the step of storing information relevant to the image recordation.

23. The method as defined in claim 22, wherein said stored information includes the guest's identification and location, as well as an indication of the particular image capture means activated and the time recordation began.

24. An apparatus for use in an amusement park, comprising:

a plurality of cameras, a camera being located at each one of a plurality of geographically diverse locations;

a plurality of tag readers, each tag reader being located substantially at one of the plurality of geographically diverse locations and being associated with at least one of said plurality of cameras for identifying an amusement park guest that has a unique tag and for supplying information as to the location of the amusement park guest that has a unique tag;

a communications network for transporting at least images captured by said plurality of cameras; and an image storage system for storing images captured by said plurality of cameras that is responsive to information supplied from said plurality of tag readers to produce for each guest a personal image collection reflecting his visit to the amusement park.

25. The apparatus as defined in claim 24, further including means for indicating that the image from a particular camera is being recorded.

26. The apparatus as defined in claim 24, further including auxiliary trigger means for controlling the initiation of recording from an associated one of said cameras.

27. The apparatus as defined in claim 24, wherein images are recorded for a particular guest only from selected ones of said cameras in response to prestored selections made by said particular guest.

28. An apparatus for use in an amusement park, comprising:

a plurality of video cameras, each being located at one of a plurality of geographically diverse locations;

a plurality of tag readers, each tag reader being located substantially at one of the plurality of geographically diverse locations and being associated with at least one of said plurality of video cameras, for identifying an amusement park guest that has a unique tag and for supplying information as to the location of the amusement park guest that has a unique tag;

a cross-connect network for transporting control information and images;

a plurality of video recording units, one unit being assigned to each tagged guest and each unit receiving video signals from said plurality of video cameras via said cross-connect network; and a control system responsive to information from said plurality of tag readers for controlling the storage of images captured by said plurality of video cameras at each of said video recording units to produce personal image collections each reflecting a different one of said guests' visit to the amusement park.

29. The apparatus as defined in claim 28, wherein, prior to recording of any images captured by said plurality of video cameras in response to said plurality of tag readers, the media of recording in said plurality of video recording units is prerecorded with stock footage of said amusement park.

30. The apparatus as defined in claim 28, wherein said tags are passive radio devices.

31. The apparatus as defined in claim 28, including camera active indicating means associated with one of said video cameras for indicating that the image supplied from said video camera is being recorded at the guest's video recording unit.

32. The apparatus as defined in claim 28, further including auxiliary trigger means associated with one of said plurality of video cameras for controlling the starting of recording of the image from said associated video camera.

* * * * *